United States Patent
Durante et al.

(10) Patent No.: US 7,258,008 B2
(45) Date of Patent: Aug. 21, 2007

(54) MICRO-ELECTRO-MECHANICAL GYROSCOPE HAVING ELECTRICALLY INSULATED REGIONS

(75) Inventors: Guido Spinola Durante, Gavirate (IT); Simone Sassolini, Vidigulfo (IT); Andrea Rusconi Clerici, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/317,623

(22) Filed: Dec. 22, 2005

(65) Prior Publication Data

US 2006/0162448 A1   Jul. 27, 2006

(51) Int. Cl.
G01P 9/04 (2006.01)
G01C 19/00 (2006.01)

(52) U.S. Cl. .............................. 73/504.04; 73/504.14; 73/504.12

(58) Field of Classification Search ............. 73/504.02, 73/504.04, 504.12, 504.13, 504.14, 504.15, 73/504.16
See application file for complete search history.

(56) References Cited

U.S. PATENT DOCUMENTS

| | | | |
|---|---|---|---|
| 6,044,707 A * | 4/2000 | Kato .................... | 73/504.14 |
| 6,134,961 A * | 10/2000 | Touge et al. ............. | 73/504.12 |
| 6,250,156 B1 * | 6/2001 | Seshia et al. ............ | 73/504.12 |
| 6,516,651 B1 * | 2/2003 | Geen ......................... | 73/1.16 |
| 6,691,571 B2 * | 2/2004 | Willig et al. ............. | 73/504.12 |
| 7,051,591 B2 * | 5/2006 | Chaumet et al. ......... | 73/504.12 |

FOREIGN PATENT DOCUMENTS

| JP | 11-337342 | 12/1999 |
|---|---|---|
| WO | WO98/57529 | 12/1998 |

* cited by examiner

*Primary Examiner*—Helen Kwok
(74) *Attorney, Agent, or Firm*—Lisa K. Jorgenson; Harold H. Bennett, II; Seed IP Law Group PLLC (57) ABSTRACT

An Integrated gyroscope includes a suspended mass; mobile actuation electrodes extending from the suspended mass; and a sensing mass connected to the actuation mass through coupling springs. The suspended mass is formed by an external part and an internal part, electrically separated by an electrical-insulation region having a closed annular shape. The electrical-insulation region is laterally completely surrounded by the external part and by the internal part. In one embodiment, the suspended mass has the shape of a closed frame delimiting an opening, the sensing mass is formed inside the opening and is connected to the internal part, and the mobile actuation electrodes are connected to the external part.

23 Claims, 6 Drawing Sheets

MICRO-ELECTRO-MECHANICAL GYROSCOPE HAVING ELECTRICALLY INSULATED REGIONS

BACKGROUND OF THE INVENTION

1. Field of the Invention

The subject of the present invention is a micro-electro-mechanical gyroscope having electrically insulated regions.

2. Description of the Related Art

As is known, integrated gyroscopes of semiconductor material, obtained through the MEMS (Micro-Electro-Mechanical Systems) technology, operate according to the theorem of relative accelerations, exploiting the Coriolis acceleration. In particular, when a linear velocity is applied to a mobile mass rotating at an angular velocity, in the reference system fixed to the mobile mass, the mass is subject to an apparent force, referred to as the Coriolis force, which brings about a displacement thereof perpendicularly to the linear velocity and to the axis of rotation. The apparent force can be thus detected by supporting the mobile mass via springs that enable a displacement thereof in the direction of the apparent force. According to Hooke's law, this displacement is proportional to the apparent force, which is correlated to the angular velocity. Consequently, detection of the displacement of the mobile mass enables detection of the Coriolis force and thus of the angular velocity.

In gyroscopes of the type considered, the displacement of the mobile mass is detected in a capacitive way, by measuring at resonance the capacitance variations caused by the movement of mobile sensing electrodes rigid with the mobile mass and interfaced or comb-fingered with fixed sensing electrodes.

An embodiment of an integrated gyroscope made as MEMS in planar technology is for example described in U.S. Pat. No. 6,766,689, assigned to STMicroelectronics Srl. This integrated gyroscope is formed by an actuation assembly, by a sensitive mass actuated in a first direction lying in the plane of the sensitive mass and moreover mobile in a second direction, which also lies in the plane of the sensitive mass, and by a capacitive sensing system facing the sensitive mass and capable of detecting the movements of the latter in the second direction. The gyroscope has a rotation axis perpendicular to the plane of the sensitive mass so that, subject to an external angular velocity, the sensitive mass moves in the second direction.

In another patent application filed in the name of the present applicant and assigned to STMicroelectronics Srl. (U.S. Pat. No. 6,928,872), a gyroscope is moreover described capable of detecting the Coriolis force even when this acts perpendicularly to the plane of the sensitive mass.

In U.S. application Ser. No. 11/177,474, filed Jul. 7, 2005 and assigned to STMicroelectronics Srl., for the purpose of obtaining high performance and preventing cross-talk between actuation and reading of the signal, the actuation assembly and the sensitive mass, at least in the part facing the capacitive sensing system, are biased at different voltages. In particular, given that the mechanical assemblies are formed in a same structural layer (epitaxial or pseudo-epitaxial layer), they are electrically decoupled via insulation regions closed at the top and at the bottom by plugs that guarantee on the one hand the desired electrical insulation and, on the other hand, protection of the insulation during the fabrication steps of the gyroscope, in particular during trench etching (Deep Reactive Ion-Etching or DRIE of the epitaxial silicon) for defining the structure and etching sacrificial layers so as to free it.

This solution is highly advantageous, but does not afford protection of the lateral portions of the insulation regions which face the delimitation trenches. Even though the lack of protection on this edge during the fabrication process is not essential, since removal of a small part of the insulation on the side does not normally jeopardize insulation between the parts, in some situations it can give rise to drawbacks.

In fact, where conductive particles of small dimensions (1-2 µm) are present in the environment, these can penetrate into the delimitation trench of the structure, in particular in the removed portion of the insulation region, and short-circuit parts biased differently, so jeopardizing operation of the device.

BRIEF SUMMARY OF THE INVENTION

An embodiment of the present invention provides a gyroscope capable of preventing the problem referred to above.

According to one embodiment of the present invention, a gyroscope is provided. In practice, the gyroscope comprises a suspended mass divided into two parts, an external part and an internal part, electrically insulated from one another by an insulation region, which is ring-shaped or in any case forms a closed line, so as not to have portions laterally facing the delimitation trenches of the various structures. In one embodiment, the suspended mass is shaped like a closed ring surrounding an opening accommodating either the sensing assembly or the actuation assembly. One between the internal and external parts constitutes, or is connected to, the sensing assembly. The other one of the two parts constitutes or is connected to the driving assembly.

According to another embodiment of the invention, a gyroscope is provided, comprising a suspended mass formed on a substrate of semiconductor material and having a shape of an open frame, and having an inner part and an outer part concentric to each other; an insulation region positioned between and concentric with, and electrically insulating, the inner and outer parts; a first plurality of anchor springs, each coupled between the outer part and the substrate; and a second plurality of anchor springs, each coupled between the inner part and the substrate, the first and second pluralities of anchor springs configured to permit movement of the suspended mass along a first direction relative to the substrate. The gyroscope further comprises a sensing mass positioned within the open frame shape of the suspended mass and coupled to the suspended mass via a plurality of coupling springs configured to permit movement of the sensing mass along a second direction relative to the substrate.

BRIEF DESCRIPTION OF THE SEVERAL VIEWS OF THE DRAWINGS

For an understanding of the present invention preferred embodiments thereof are now described, purely by way of non-limiting example, with reference to the attached plate of drawings, in which.

DETAILED DESCRIPTION OF THE INVENTION

Figure 1:
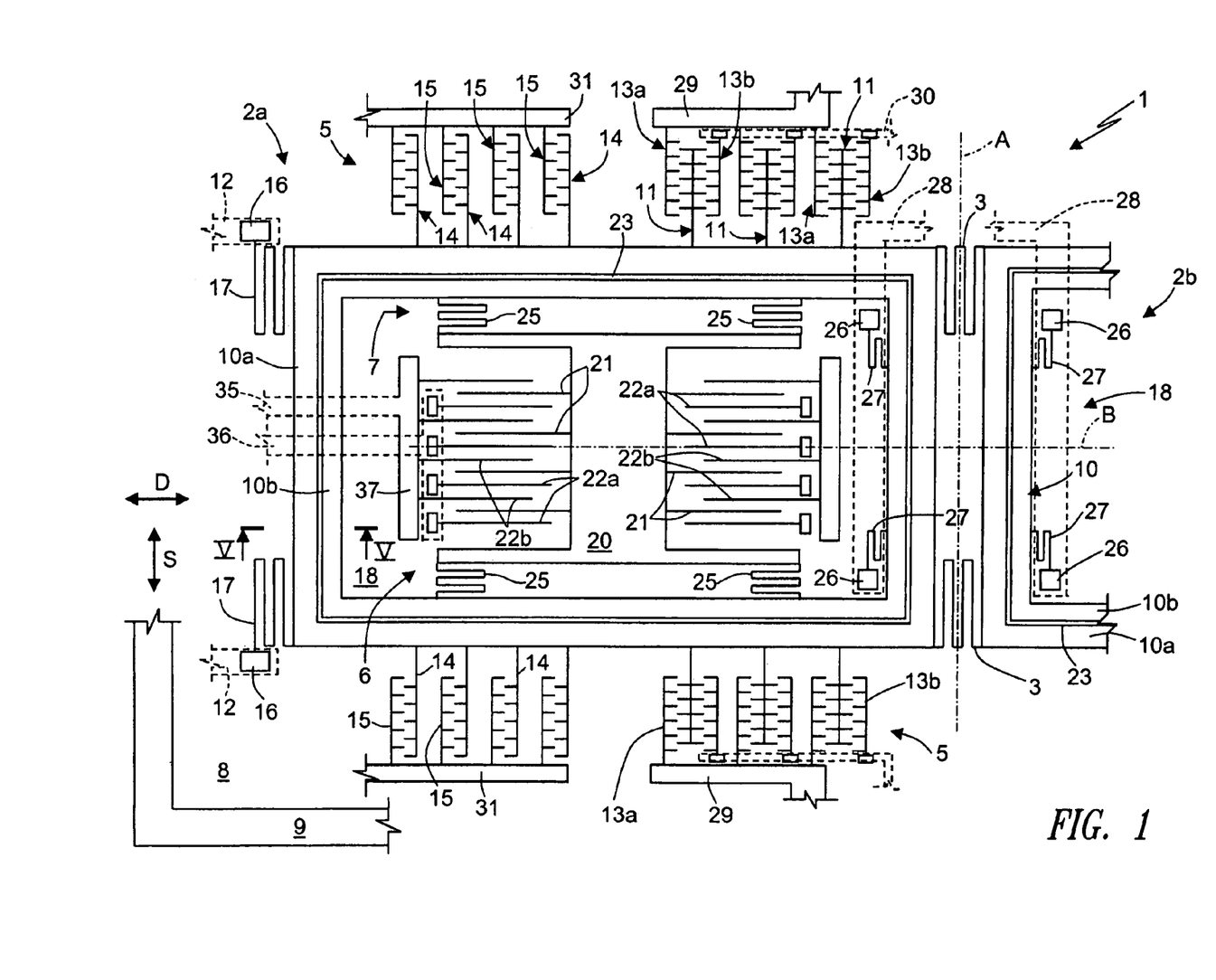
FIG. 1 shows the layout of an embodiment of a gyroscope according to the invention.

FIG. 1 shows the layout of a gyroscope 1 wherein the actuation structure is external and the suspended mass encloses the sensing structure. The gyroscope 1 is made of a semiconductor material, preferably silicon, and is obtained using the fabrication techniques of MEMS devices. In particular, the embodiments described refer to a planar system, the parts whereof are made in a same structural layer, typically an epitaxial or pseudo-epitaxial layer (i.e., a layer with a polycrystalline structure, grown with epitaxial techniques—see, for example, U.S. Pat. No. 6,209,394).

The gyroscope 1 is formed by two parts 2a, 2b, which are symmetrical with respect to a central axis of symmetry, designated by A, and are connected together via two central springs 3, arranged symmetrically with respect to a horizontal centroidal axis designated by B. Consequently, the right-hand part 2b is shown only partially.

Each part 2a, 2b comprises an actuation system 5, an accelerometer 6, and a mechanical connection 7, which connects the actuation system 5 to the accelerometer 6. In the ensuing description, reference will be made to the left-hand part 2a but the description applies also to the right-hand part 2b.

In detail, the actuation system 5 comprises a suspended mass 10, mobile actuation electrodes 11, fixed actuation electrodes 13a, 13b, mobile actuation-feedback electrodes 14, and fixed actuation-feedback electrodes 15 (see U.S. application Ser. No. 11/195,347, filed Aug. 2, 2005 on behalf of STMicroelectronics Srl.).

The suspended mass 10 here has a closed shape with a hole in the middle (in particular, it has the shape of a rectangular frame), which delimits on its inside an opening 18, and is divided into a first part 10a and a second part 10b by an insulation region 23. In the embodiment of FIG. 1, the first part 10a is external and the second part 10b is internal.

Also the insulation region 23 has a closed shape (here rectangular) and is made of electrically insulating material, for example silicon oxide, so as to electrically separate the two parts 10a, 10b of the suspended mass. As may be noted from FIG. 1, the insulation region 23 is surrounded completely on its outside by the first part 10a, and on its inside completely surrounds the second part 10b. In this way, the insulation region 23 does not have any portions facing the internal periphery or the external periphery of the suspended mass 10 (and thus facing the trench 8 that separates the suspended mass 10 from the rest of the chip 9, indicated only schematically in FIG. 1).

For the purpose of the present specification and claims, the term concentric may be used in describing features, such as, for example, the first part 10a of the suspended mass 10 and the insulation region 23, without reference to the actual shape of the respective feature, insofar as one of the described features has a closed shape that surrounds or is surrounded by the other feature.

The suspended mass 10 is supported by two first anchorages 16 via first anchorage springs 17, which extend from the first part 10a of the suspended mass 10 starting from two of its external edges. The first anchorages 16 are connected to first biasing regions 12, here buried, as indicated by the dashed area.

Furthermore, the suspended mass 10 is supported by two second anchorages 26 via second anchorage springs 27, which extend from the second part 10b of the suspended mass 10 starting from the two internal edges opposite to the ones connected to the first anchorage springs 17. The second anchorages 26 are connected to second biasing regions 28, which are also buried. In this way, the first part 10a of the suspended mass 10 can be biased independently of the second part 10b.

Both the mobile actuation electrodes 11 and the mobile actuation-feedback electrodes 14 extend directly from two opposite sides of the first part 10a of the suspended mass 10. They are thus biased at the same voltage as the first part 10a through the first anchorages 12. The mobile actuation electrodes 11 are comb-fingered to the fixed actuation electrodes 13a, 13b which are biased via third and fourth biasing regions 29, 30 (biasing regions 30 being in part buried). Furthermore, the mobile actuation-feedback electrodes 14 are comb-fingered to the fixed actuation-feedback electrodes 15 which are biased by fifth biasing regions 31.

The accelerometer 6 comprises a sensing mass 20 and mobile sensing electrodes 21 comb-fingered with first and second fixed sensing electrodes 22a, 22b. The sensing mass 20 is formed inside the opening 18 and is carried by the suspended mass 10 through coupling springs 25, which constitute the mechanical connection 7 and electrically connect the second part 10b of the suspended mass 10 to the sensing mass 20. In the representation of FIG. 1, the sensing mass 20 is shaped like an H rotated through 90°, with two transverse arms from the ends of which there extend the coupling springs 25, and a cross member having two opposite sides from which there extend the mobile sensing electrodes 21. The first fixed sensing electrodes 22a are biased via sixth sensing biasing regions 35, of buried type, and the second fixed sensing electrodes 22b are connected to seventh sensing biasing regions 36 through supporting regions 37. For reasons of clarity of illustration, the portion of the sixth and seventh sensing biasing regions 35, 36 that reach the first and second fixed sensing electrodes 22a, 22b on the right of the sensing mass 20 are not shown.

In use, in a per se known way, the suspended mass 10 is set in oscillation in the direction indicated by the double-headed arrow D on account of the mutual alternating attraction between the mobile actuation electrodes 11 and the fixed actuation electrodes 13a and 13b. The suspended mass 10 drives the sensing mass 20 in oscillation, the sensing mass 20 being moreover free to move in the direction indicated by the double-headed arrow S thanks to the coupling springs 25. Consequently, any possible displacements in the direction S due to Coriolis acceleration can be detected by the sensing electrodes 21, 22a, 22b and enable the angular movements which cause Coriolis acceleration to be brought about, in a per se known way.

Furthermore, the mobile actuation-feedback electrodes 14 and the fixed actuation-feedback electrodes 15 form part of a control feedback loop used for exciting and maintaining continuously in oscillation the actuation mass 5 at a natural pulsation of resonance, as described in U.S. application Ser. No. 11/195,347, filed Aug. 2, 2005, in the name of the same present applicant.

Figure 2A:
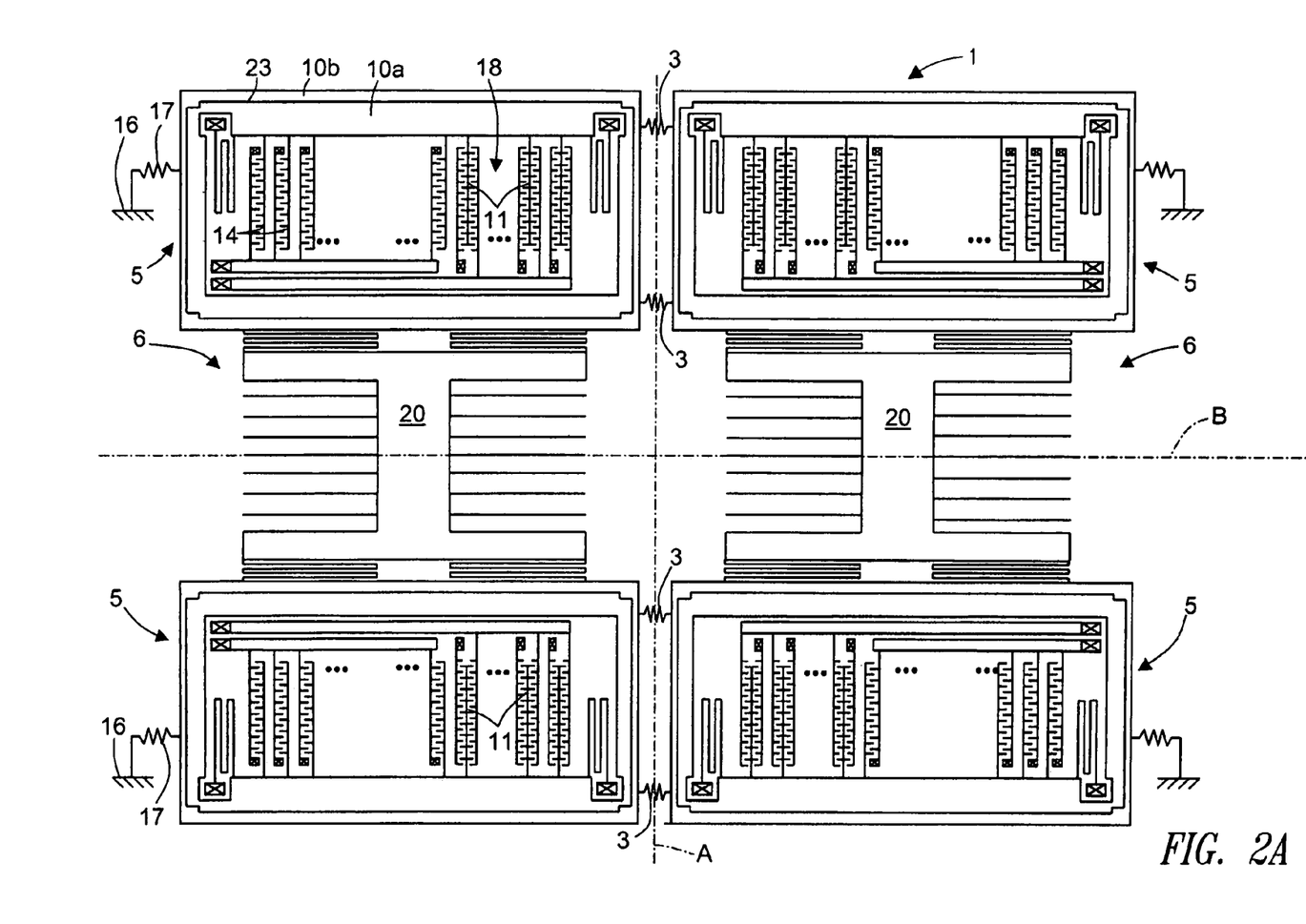
FIG. 2A shows the layout of another embodiment of a gyroscope according to the invention.
Figure 2B:
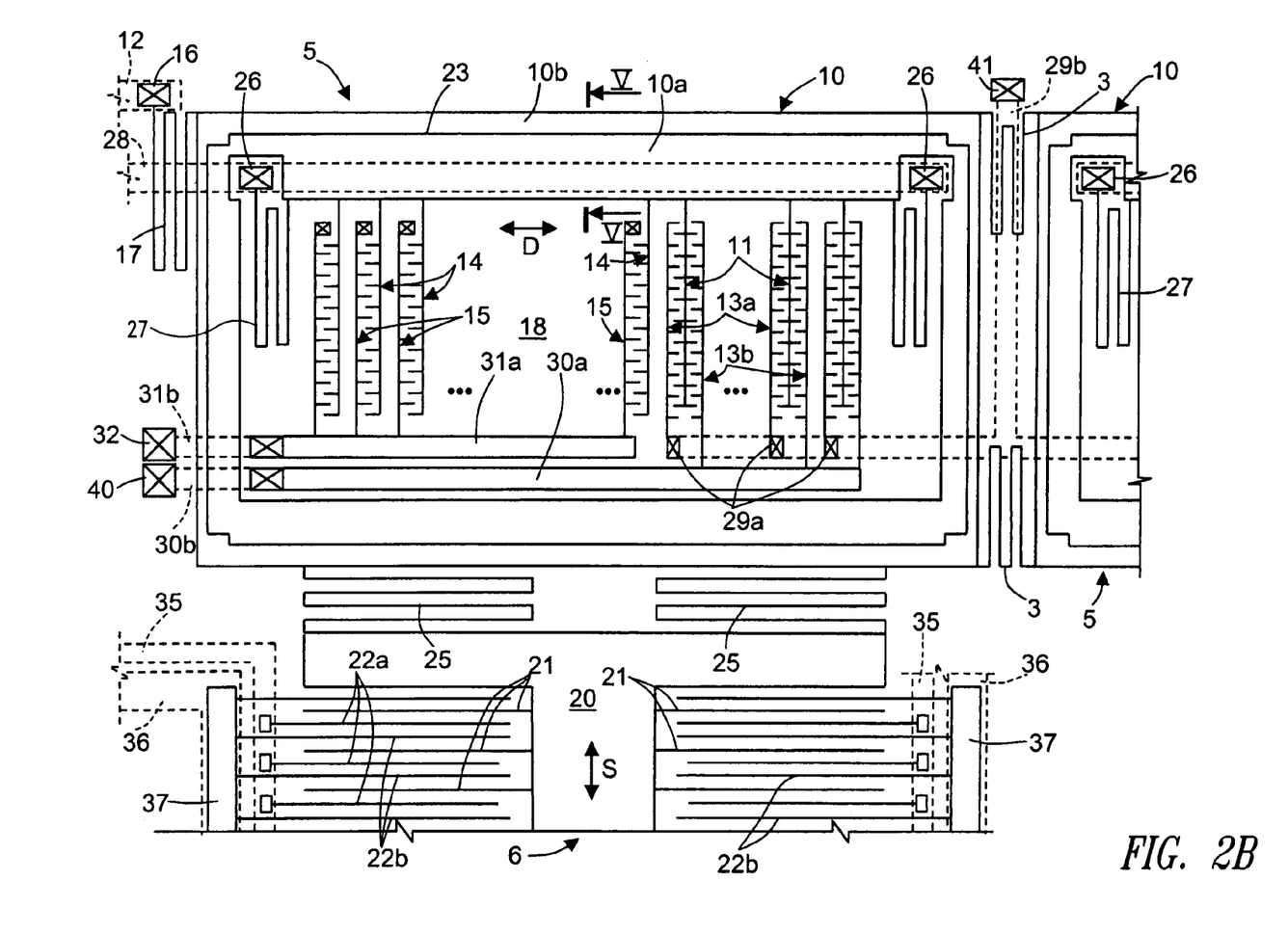
FIG. 2B shows a part of the gyroscope of FIG. 2A at an enlarged scale.

FIGS. 2a and 2b show an embodiment wherein the suspended mass 10 has once again a closed shape with a hole in the middle, but the sensing structure is external and the suspended mass encloses the actuation structure. In these figures, the elements common to those of the embodiment of FIG. 1 are designated by the same reference numbers.

As may be noted in FIG. 2a, which represents the structure in a schematic way, the gyroscope 1 is here formed by four actuation structures 5, connected so as to form two pairs. The two actuation structures 5 of each pair are connected to one another via the central springs 3 and are arranged symmetrically with respect to the first axis of symmetry A. The pairs of actuation structures 5 are moreover arranged symmetrically with respect to the second axis of symmetry B. Furthermore, the pairs of actuation structures 5 carry two sensing structures 6, arranged symmetrically with respect to the first axis of symmetry A. Each sensing structure 6 has moreover approximately a central symmetry with respect to the second axis of symmetry B. Given the symmetry of the structure, hereinafter reference will be made to FIG. 2b, which shows in detail just one of the actuation structures 5 and part of a sensing structure 6.

As is shown in FIG. 2b, each actuation structure 5 comprises a suspended mass 10, mobile actuation electrodes 11, fixed actuation electrodes 13a, 13b, mobile actuation-feedback electrodes 14, and fixed actuation-feedback electrodes 15.

As indicated above, also here the suspended mass 10 has the shape of a rectangular frame, similar to that of FIG. 1, and is therefore described only as regards the elements that differ therefrom. Furthermore, elements that are the same are designated by the same reference numbers. In this second embodiment (see also FIG. 3), the first part 10a is internal and the second part 10b is external.

The suspended mass 10 is supported by one first anchorage 16 via one first anchorage spring 17, which extends from the second part 10b of the suspended mass 10 starting from one external edge thereof. The first anchorage 16 is connected to a first biasing region 12, which is buried.

Furthermore, the suspended mass 10 is supported by two second anchorages 26 via second anchorage springs 27. The second anchorage springs 27 are connected to the first part 10a of the suspended mass 10 and extend from the two internal edges thereof, set remotely with respect to the sensing structure 6.

The mobile actuation electrodes 11 and the mobile actuation-feedback electrodes 14 extend inside the opening 18 starting from the first part 10a of the suspended mass 10. They are thus biased at the same voltage as the first part 10a through the second anchorages 26. The mobile actuation electrodes 11 are comb-fingered to the fixed actuation electrodes 13a, 13b. The fixed actuation electrodes 13a are biased via anchorages of fixed electrodes 29a, formed inside the opening 18, and a third biasing region 29b, which is buried and is shown in dash lines, connected to an external pad 41. The fixed actuation electrodes 13b are biased via a fourth biasing region 30a, connected with an external pad 40 through a short buried stretch 30b, shown by dashed lines. Furthermore, the fixed actuation-feedback electrodes 15 are connected to an external pad 32 via an anchorage feedback region 31a and a short buried stretch 31b, illustrated by dashed lines. On top of the feedback anchorage region 31a a metal region (not illustrated) may be provided, for reducing the resistance between the fixed actuation-feedback electrodes 15 and the external pad 32. Likewise a metal region can be provided on top of the fourth biasing region 30a.

The accelerometer 6, as indicated above, is here external to the suspended masses 10. Each accelerometer 6 is arranged between two suspended masses 10 arranged symmetrically with respect to the second axis of symmetry B (FIG. 2a) and is supported by the second parts 10b of said masses, through the coupling springs 25. Consequently, in this case, the accelerometers 6 are biased through the first anchorages 16. Otherwise, the structure of the accelerometers 6 is the same as that of FIG. 1, and will thus not be described any further herein.

Figure 3:
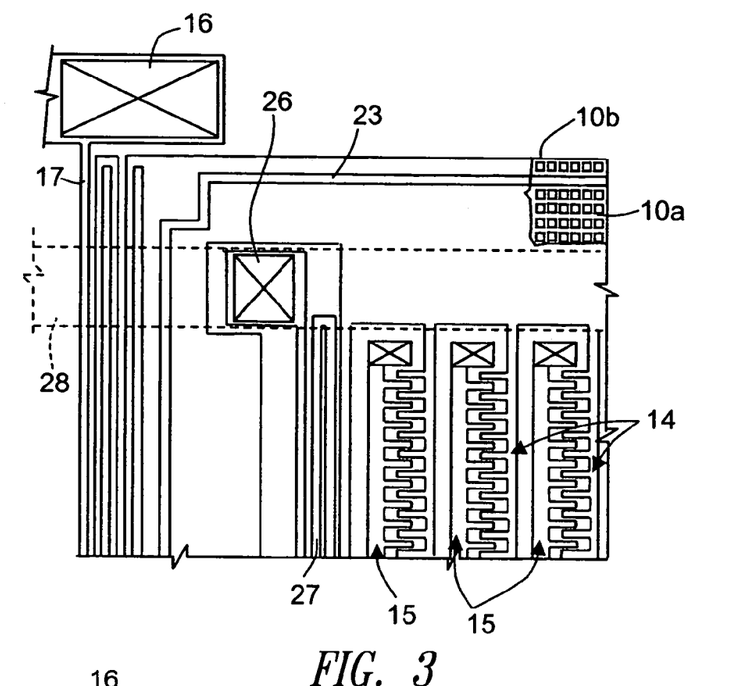
FIG. 3 shows an enlarged detail of the gyroscope of FIGS. 2A and 2B.

Advantageously, as may be seen in particular from the enlarged detail of FIG. 3, the insulation region 23 here has a zigzag portion, for example next to the edges. In this way, the structure is more symmetrical, and the parts subjected to stress are arranged at a distance from the sensitive parts of the mechanical structure. In this way, the accelerometer is less subject to strains due to any possible stress caused by the difference between the materials constituting the two parts 10a, 10b and the insulation region 23, which are amplified by the fabrication process (for example, differences in temperatures of deposition of the various structural layers can bring about residual voltages in the mechanical structures). There is also an improvement in the temperature behaviour of the sensor.

Furthermore, in the embodiment shown in FIG. 3, a distance margin is kept between the first anchorage 16 and the suspended mass 10. In this way, residual stresses are prevented from modifying the elastic constant.

Figure 4:
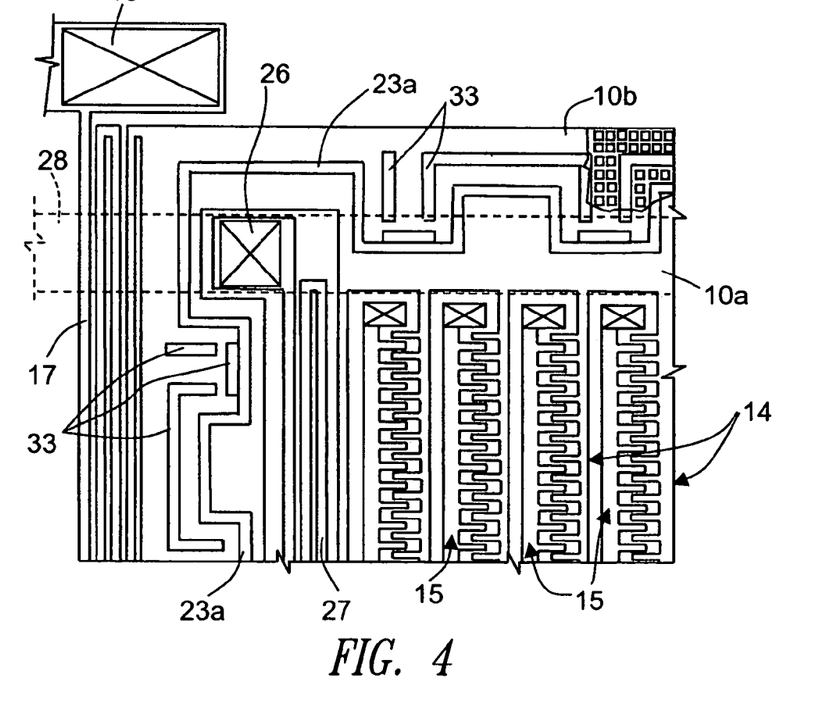
FIG. 4 shows a different embodiment of the detail of FIG. 3.

As an alternative to the embodiment shown in FIG. 3, the insulation region 23 can present a zigzag pattern throughout its length, as shown only for a short stretch in FIG. 4. This zigzag pattern enables a reduction in the stress of the weak points of the structures.

Conveniently, for reducing further the stresses existing in the structure, diggings 33 may be provided, as shown for example in FIG. 4. In this case, the diggings 33 are made only in the external part of the suspended mass 10 (here constituting the second part 10b), so as to follow partially the shape of the insulation region 23. The shape and position of the diggings 33 may however vary, according to the geometries and dimensions of the various parts. Furthermore, the zigzag pattern enables release of the stresses, since it enables an adaptation of the material and an additional deformability, and the diggings 33 can be made also for the gyroscope 1 of FIG. 1.

Figures 5, 6:
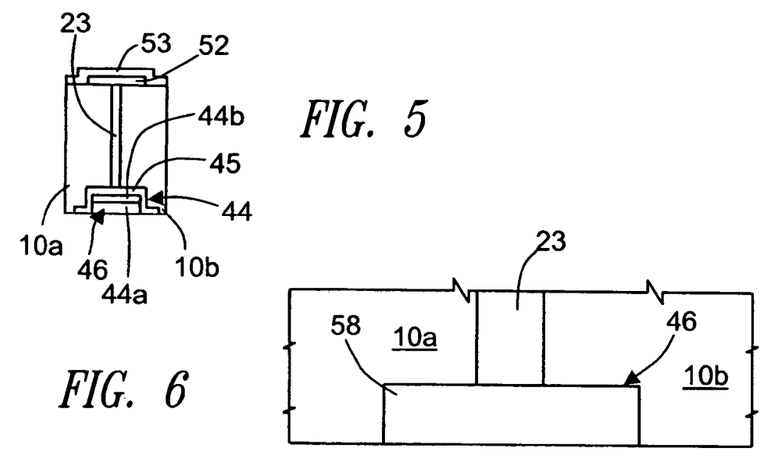
FIGS. 5-9 show enlarged cross sections of a portion of the gyroscopes of FIGS. 1 and 2, taken along line V-V of FIG. 2.

Possible embodiments of the insulation region 23 are described in the aforementioned U.S. application Ser. No. 11/177,474, filed Jul. 7, 2005. In the example of FIG. 5, the insulation region 23 extends practically throughout the thickness of the suspended mass 10, with the exception of the bottom portion thereof, wherein a bottom plug element 46 is present, formed by a bottom protection region 44 and a top protection region 45. The bottom protection region 44 is constituted for example by a polysilicon region 44a and by an oxide region 44b. The top protection region 45 is preferably made of silicon carbide. Furthermore, the insulation region 23 is covered by a top plug element 52, for example of TEOS, in turn coated by a protective layer 53 of silicon carbide.

In the embodiment of FIG. 6, the bottom plug element 46 is formed by a single region, for example of silicon carbide 58.

Figure 7:
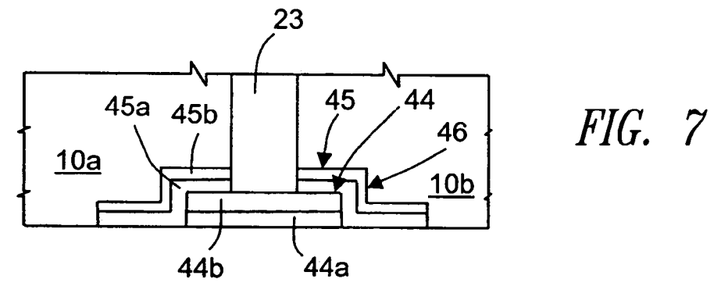

FIG. 7 shows an embodiment wherein the top protection region 45 is formed by two portions: one bottom portion 45a, for example of silicon carbide, and a top portion 45b, for example of silicon nitride.

Figure 8:
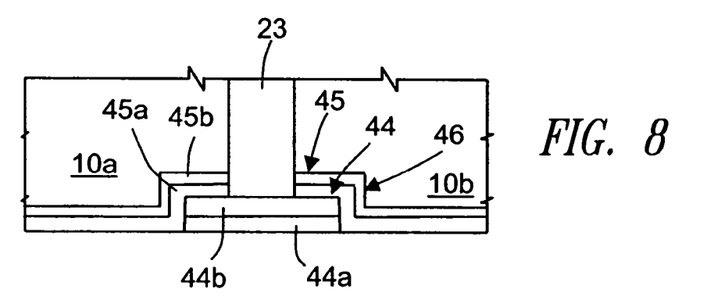

FIG. 8 shows an embodiment of the bottom plug element 26 similar to that of FIG. 7, in which, however, the silicon carbide layer 45a and the silicon nitride layer 45b extend underneath the entire structural layer (here represented by 10a and 10b). Possibly, also in this case, the top protection region 45 could be formed just by a silicon carbide layer 45a, in a way similar to what is shown in FIG. 5.

Figure 9:
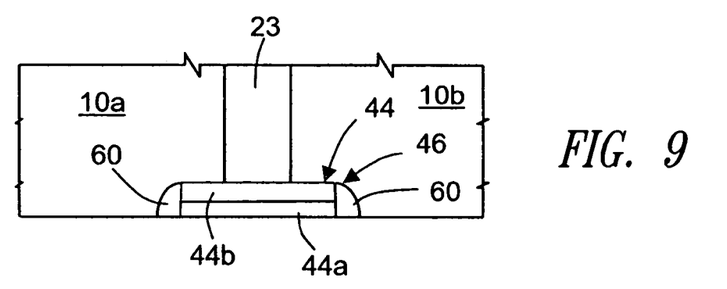

Finally, FIG. 9 shows an embodiment wherein the bottom protection region 44 has spacers 60 of nitride.

The gyroscope 1 described above with reference to FIGS. 1-9 can be obtained using the process described in U.S. application Ser. No. 11/177,474, mentioned above and described briefly hereinafter. In particular, the gyroscope 1 is obtained starting from a substrate of semiconductor material, on top whereof sacrificial regions are formed (where the suspended parts are wanted). Then, the bottom plug elements 44 are made, and a structural polycrystalline layer is grown epitaxially. Inside the structural layer, trenches are dug and filled with insulating material, so as to form the insulation regions 23. Then the top plug elements 52 and the metal lines are formed. Using an appropriate mask, the delimitation trenches 8, the opening 18, and the diggings 33 (where envisaged) are made, as well as holes that enable both the structure to be lightened and the sacrificial regions to be reached. Finally, the suspended structures are freed, by removing the sacrificial regions through the delimitation trenches 8, the diggings 33, as well as the holes purposely provided.

As is evident from the foregoing description, the insulation region 23 has no portions facing the delimitation trenches 8 and the opening or openings 18, thanks to its closed conformation. Furthermore, the insulation region 23 is insulated at the top and at the bottom, thanks to the bottom and top plug elements 46 and 52.

Consequently, the insulation region 23 is completely insulated from the outer environment, and any leakage of the insulation dielectric is prevented, as instead possible when the insulating junction between two conductor materials is not adequately protected. Furthermore, it is much less likely for the mobile actuation portion (first part 10a of the suspended mass 10) to be electrically connected to the sensing mobile portion (second part 10b of the suspended mass 10 and sensing mass 20) by dust particles or other particles present in the environment, which have a typical size in the order of a micron. The electrical separation between the actuation structures and the sensing ones is thus always guaranteed.

Furthermore, the insulation region 23 is completely protected by top plugs during the etching steps for defining the structure and for its freeing, when the sacrificial regions (not shown) are removed, as explained above with reference to the aforementioned U.S. application Ser. No. 11/177,474.

Figure 10:
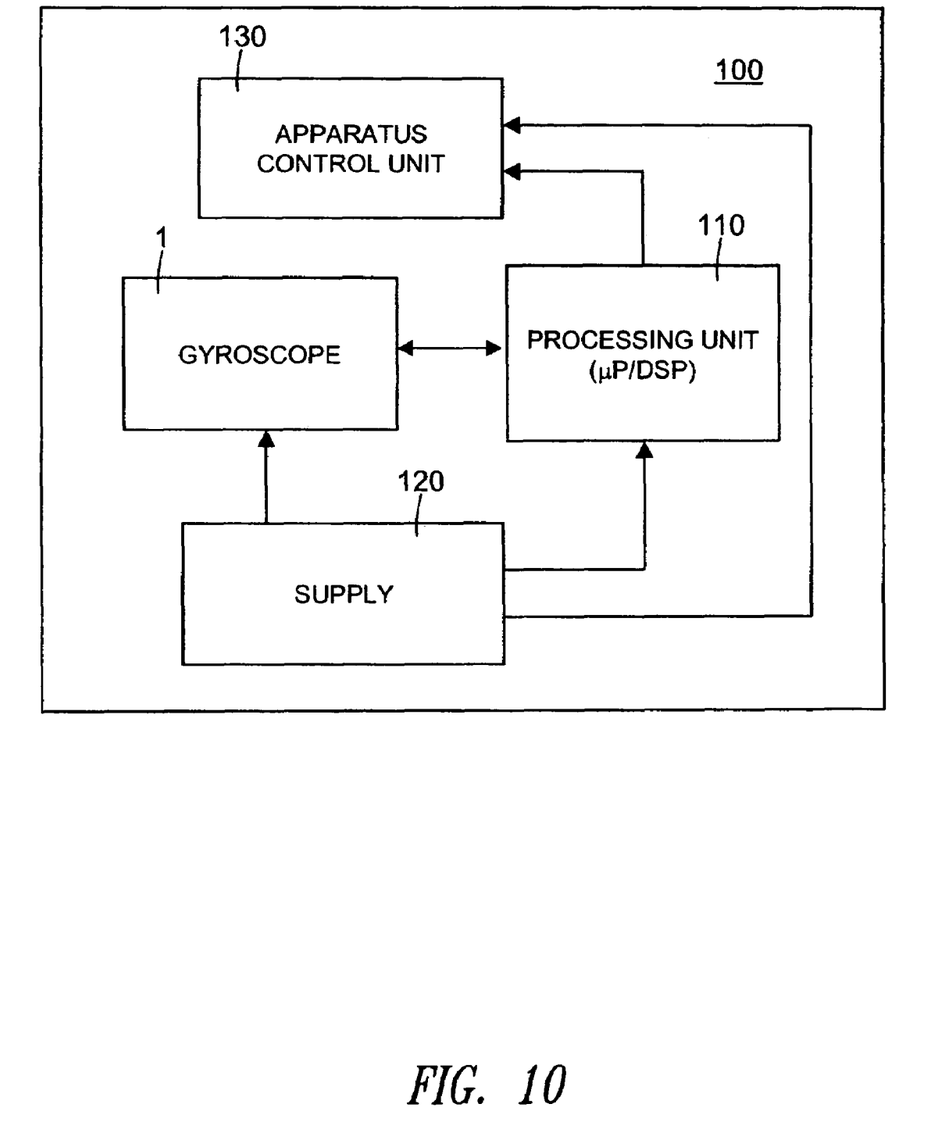
FIG. 10 shows a block diagram of an apparatus including the present gyroscope.

FIG. 10 shows a possible application of the gyroscope embodiments described and illustrated herein. An apparatus 100, whereof only some of the elements are shown, comprises a gyroscope 1, a processing unit 110, a supply 120, and a control unit 130.

The apparatus 100, in general of a portable type, can be for example: a digital camcorder which uses the signals issued by the gyroscope 1 for stabilization of the image; a GPS (Global Positioning System) navigation device, which uses the signals issued from the gyroscope to increase the detail or uses these signals in addition to the signals supplied by the satellite; a game device, the commands whereof issued by the user are translated into movements of the apparatus; or a cellphone with GPS functions.

The gyroscope 1 is connected to the processing unit 110 and exchanges therewith the sensing and feedback signals necessary for its operation (as described in the aforementioned U.S. patent application Ser. No. 11/195,347, filed Aug. 2, 2005). The processing unit 110 comprises a digital signal-processing portion, for example a microprocessor or a DSP (Digital Signal Processor), for processing the position signals, and an appropriate interface including a module for controlling the gyroscope 1, and a module for analogue processing of the electrical signals issued by the gyroscope 1. The control unit 130 performs the function proper of the apparatus 100 and uses the acceleration/position signals provided by the processing unit 130. The supply unit 120, connected for example to a battery (not illustrated), generates all the biasing voltages necessary for the operation of the apparatus 100.

Finally, it is clear that numerous modifications and variations may be made to the gyroscope described and illustrated herein, all of which fall within the scope of the invention, as defined in the annexed claims.

For example, the suspended mass 10 can have a shape different from the one illustrated, for example can have a polygonal, oval, or circular shape or be constituted by segments arranged in a closed broken line.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An integrated gyroscope, comprising:
 a first suspended mass formed by an external part and an internal part that are electrically separated from each other by an electrical-insulation region having a closed annular shape completely surrounded at sides thereof by said external and internal parts;
 first mobile actuation electrodes connected to a first one of said internal and external parts of said suspended mass; and
 a first sensing mass connected to a second one of said internal and external parts of said suspended mass.

2. The gyroscope according to claim 1 wherein said first suspended mass has a shape of a closed frame.

3. The gyroscope according to claim 1 wherein said first suspended mass and said first sensing mass are made from a same structural layer.

4. The gyroscope according to claim 1 wherein said first suspended mass is supported through at least first and second anchorage regions, a first anchorage spring extending between and connecting electrically said external part of said first suspended mass and said first anchorage region, and a second anchorage spring extending between and connecting electrically said internal part of said first suspended mass and said second anchorage region.

5. The gyroscope according to claim 4 wherein said first suspended mass delimits an opening, said first anchorage spring and said first anchorage region extend on the outside of said first suspended mass, said second anchorage spring and said second anchorage region extend inside said opening.

6. The gyroscope according to claim 4 wherein said first suspended mass has the shape of a rectangular frame, and said first and second anchorage springs extend approximately from edges of said rectangular frame.

7. The gyroscope according to claim 1, further comprising mobile actuation-feedback electrodes, which face fixed actuation-feedback electrodes, extend from said first suspended mass next to said first mobile actuation electrodes, and are connected to said second one said internal and external parts.

8. The gyroscope according to claim 1 wherein said first suspended mass is mobile in a first direction, and said first sensing mass is carried by said first suspended mass through coupling springs that enable a displacement of said first sensing mass in a second direction transverse to said first direction.

9. The gyroscope according to claim 1 wherein said first suspended mass delimits an opening, said first mobile actuation electrodes extend from said external part of said first suspended mass, and said first sensing mass is accommodated in said opening and is connected to said internal part.

10. The gyroscope according to claim 1, comprising:
a second suspended mass symmetrical to said first suspended mass and having an own external part and an own internal part electrically separated by an own electrical-insulation region having a closed annular shape;
second mobile actuation electrodes connected to said internal part of said second suspended mass; and
wherein said first suspended mass and said second suspended mass each delimit a respective opening, said first sensing mass being connected between said external parts of said first suspended mass and of said second suspended mass, said first mobile actuation electrodes extending inside the opening delimited by the first suspended mass and being connected to the internal part of said first suspended mass, and said second mobile actuation electrodes extending inside the opening delimited by the second suspended mass and being connected to the internal part of said second suspended mass.

11. The gyroscope according to claim 10, comprising:
third and fourth suspended masses formed and positioned substantially symmetrically with said first suspended mass and said second suspended mass;
a first central spring connected between said first suspended mass and said third suspended mass;
a second central spring connected between said second suspended mass and said fourth suspended mass; and
a second sensing mass connected between external parts of said third and fourth suspended masses.

12. The gyroscope according to claim 1, comprising:
a second suspended mass formed and positioned substantially symmetrically with said first suspended mass and including an external part and an internal part that are electrically separated from each other by an electrical-insulation region having a closed annular shape completely surrounded at the sides by said external and internal parts;
central springs connected between said first suspended mass and said second suspended mass;
second mobile actuation electrodes connected to said external part of said second suspended mass; and
a second sensing mass connected to said internal part of said second suspended mass.

13. An electrical apparatus comprising:
a gyroscope including:
a first suspended mass formed by an external part and an internal part, which are electrically separated by an electrical-insulation region having a closed annular shape completely surrounded at the sides by said external and internal parts,
mobile actuation electrodes connected to a first one of said internal and external parts of said suspended mass, and
a first sensing mass connected to a second one of said internal and external parts of said first suspended mass;

a signal-processing unit connected to said gyroscope; and
a supply unit connected to said gyroscope and to said processing unit.

14. The electrical apparatus of claim 13 wherein the first suspended mass has a shape of a rectangular frame defining an opening, the apparatus further comprising:
a substrate of semiconductor material;
anchorage springs connected between the first suspended mass and the substrate, and configured to permit movement of the first suspended mass in a first direction relative to the substrate; and
coupling springs connected between the first sensing mass and the first suspended mass such that the first sensing mass is positioned within the opening defined by the first suspended mass and connected to the internal part of the first suspended mass by the coupling springs so as to be movable in a second direction, perpendicular to the first direction, relative to the substrate.

15. The electrical apparatus of claim 13, comprising:
a second suspended mass formed and positioned substantially symmetrically to the first suspended mass, and wherein the first sensing mass is connected between external parts of the first suspended mass and the second suspended mass.

16. A gyroscope comprising:
a suspended mass formed on a substrate of semiconductor material and having an inner part and an outer part concentric to each other and isolated from each other by an insulation region positioned between and concentric with the inner and outer parts such that the inner part and the outer part are rigidly fixed with respect to each other, the suspended mass having a shape of an open frame;
a first plurality of anchor springs, each coupled between the outer part and the substrate; and
a second plurality of anchor springs, each being coupled between the inner part and the substrate, the first and second pluralities of anchor springs configured to permit movement of the suspended mass along a first direction relative to the substrate.

17. The gyroscope of claim 16 wherein at least one of the first plurality of anchor springs comprises an electrical coupling between the outer part and the substrate, and at least one of the second plurality of anchor springs comprises an electrical coupling between the inner part and the substrate.

18. The gyroscope of claim 16, comprising a sensing mass positioned within the open frame shape of the suspended mass and coupled to the suspended mass via a plurality of coupling springs configured to permit movement of the sensing mass along a second direction relative to the substrate.

19. A gyroscope comprising:
a suspended mass formed on a substrate of semiconductor material and having an inner part and an outer part concentric to each other and isolated from each other by an insulation region positioned between and concentric with the inner and outer parts such that the inner part and the outer part are rigidly fixed with respect to each other, the suspended mass having a shape of an open frame:
a first plurality of anchor springs, each coupled between the outer part and the substrate:
a second plurality of anchor springs, each being coupled between the inner part and the substrate, the first and second pluralities of anchor springs configured to permit movement of the suspended mass along a first direction relative to the substrate; and a sensing mass coupled between the suspended mass and a second suspended mass via a plurality of coupling springs configured to permit movement of the sensing mass along a second direction relative to the substrate.

20. The gyroscope of claim 16 wherein the open frame shaped suspended mass is in a form selected from among a polygon, an oval, and a circle.

21. The gyroscope of claim 18, comprising:
a plurality of actuation electrodes mechanically and electrically coupled to the outer part; and
a plurality of sensing electrodes mechanically coupled to the sensing mass and electrically coupled to the inner part, via the sensing mass and the plurality of coupling springs.

22. The gyroscope of claim 19, comprising:
a plurality of actuation electrodes mechanically and electrically coupled to the inner part; and
a plurality of sensing electrodes mechanically coupled to the sensing mass and electrically coupled to the outer part, via the sensing mass and the plurality of coupling springs.

23. The gyroscope according to claim 1 wherein the electrical-insulation region includes material selected from among polysilicon, an oxide, a carbide, a nitride, and TEOS.

* * * * *

UNITED STATES PATENT AND TRADEMARK OFFICE
CERTIFICATE OF CORRECTION

PATENT NO. : 7,258,008 B2
APPLICATION NO. : 11/317623
DATED : August 21, 2007
INVENTOR(S) : Guido Spinola Durante et al.

Page 1 of 1

It is certified that error appears in the above-identified patent and that said Letters Patent is hereby corrected as shown below:

On the title page should include item
--(30) Foreign Application Priority Data
December 29, 2004....................(EP) 04425957--

Signed and Sealed this

Twentieth Day of May, 2008

JON W. DUDAS
*Director of the United States Patent and Trademark Office*